May 27, 1924.

A. ARTHUR 1,495,629

LEVEL AND PLUMB

Filed Nov. 8, 1921

INVENTOR
Andrew Arthur,
BY
R. B. Hutchinson
ATTORNEY

Patented May 27, 1924.

1,495,629

UNITED STATES PATENT OFFICE.

ANDREW ARTHUR, OF NEW YORK, N. Y.

LEVEL AND PLUMB.

Application filed November 8, 1921. Serial No. 513,651.

*To all whom it may concern:*

Be it known that I, ANDREW ARTHUR, a citizen of the United States, and a resident of the city of New York, county of Bronx, and State of New York, have invented a new and useful Improvement in Levels and Plumbs, of which the following is a full, clear, and exact description.

My invention relates to improvements in levels, plumbs, and the like, and the object of my invention is to produce an instrument which is not a spirit level and has no glass to break, but which can be used like the ordinary carpenter's or mason's level to indicate whether or not an object is level, which can likewise be used as a plumb, which can also be used to indicate the more important grades or angles, and which is made in a simple, strong and inexpensive way so that it is never likely to get out of repair, and its cost is so slight as to bring it within the reach of the consumer. My invention is further intended to produce a device which can be instantly and easily operated, and will indicate from either the top or side whether or not it is level, and which is therefore easily adapted for use as a carpenter's or mason's level. Further advantages will appear from the description which follows.

Reference is to be had to the accompanying drawings forming a part of this specification, in which similar reference characters indicate corresponding parts in all the views.

Figure 1:
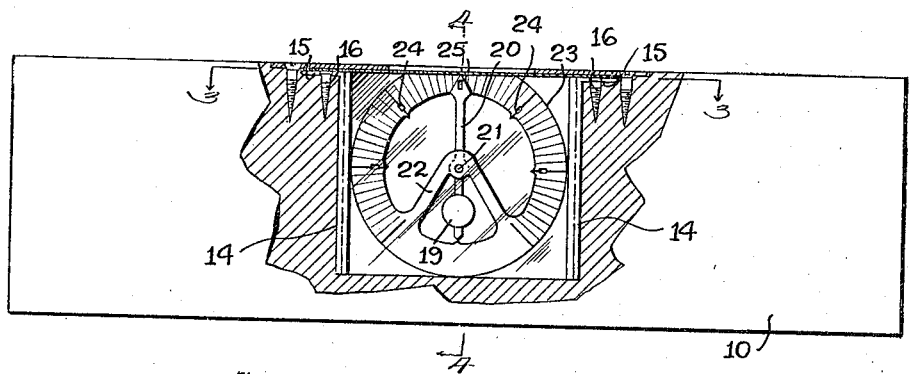
Figure 1 is a broken sectional side elevation of the device embodying my invention.
Figure 2:
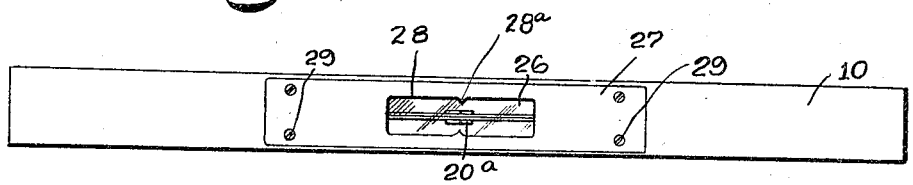
Figure 2 is a plan view thereof.
Figure 3:
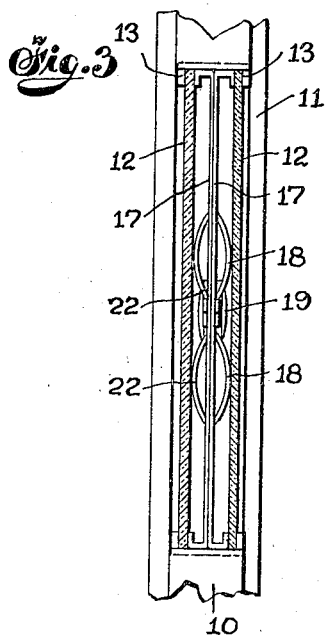
Figure 3 is a broken longitudinal section on the line 3—3 of Figure 1, through the indicating part of the level.
Figure 4:
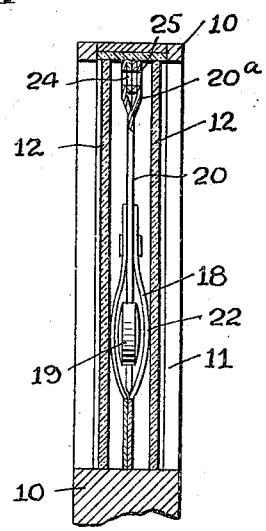
Figure 4 is a broken transverse section on the line 4—4 of Figure 1.

The level can have the usual body 10 either of wood or metal, which has a recess near the top and through the side, as shown at 11 to provide for the protecting transparent plates 12 which may be of glass, celluloid, or other suitable material, through which the position of the indicator may be seen. The transparent plates 12 can be applied in any convenient way, but I have devised a simple secure way which permits them to be easily replaced if broken, and in which the plates are dropped vertically into the grooves 13 of the frames 14, which fit down in opposite sides of the recess 11, and can be conveniently secured by providing them with flanges 15 through which fastening screws 16 may be inserted and secured to the body 10.

The frames 14 retain parallel sheet metal plates 17 which abut except at points that are bowed out, as shown at 18, to provide for pivoting the indicator, and for the swing of the pendulum 19, which is secured to the indicator or hand 20. These bowed parts 18 are preferably on the brackets 22. This hand is pivoted as shown at 21 on the brackets 22 which are formed from the plates 17, and if the body 10 is level, the pendulum 19 will hang so as to bring the indicator 20 to a vertical position, but if it is not level, the pendulum will of course bring the indicator to the same vertical position, but it will show by its relation to the graduated marks 23 on the plate 17 that the device is not level. These grade marks can be produced on the plates in any convenient way, and the plates are preferably cut out so as to leave them in a generally circular form as shown. They indicate not only the level position, but the principal degreees are marked off plainly, and at some of the degrees, for instance forty-five and ninety, the grade table or dial is perforated as shown at 24 to assist in using the instrument in a perfectly accurate manner.

The pointed end of the indicator 20 is preferably split as shown at 20ª so as to straddle the grade table, and the end of the indicator is also preferably transversely perforated as shown at 25, the perforations being adapted to register with the perforations 24 of the grade table, so that when the pointer or indicator is exactly in registry with the openings 24, the operator can see through the openings 24—25 and be certain of the position so that he will thus have a double means of ascertaining the fact, first by the exterior and quickly ascertained position of the indicator, and second by peeping through the registering holes.

It will of course be evident that the particular manner of pivoting the pendulum operated indicator, and the shape of the indicator itself, also the design of the graded table, can be changed materially without affecting the invention.

The device can be viewed from the top as well as the sides, and the frames 14 are covered at their outer ends by a transparent plate 26 which can be held in position by the face plate 27, this being preferably countersunk in the top of the body 10 so as to lie flush with said top, and the plate can be secured by screws 29 or otherwise. It is provided with an opening 28 so that the indicator can be seen through it, and thus the device can be used conveniently for mason work or other work where the operator can more easily see through the top than observe the side of the level. Opposed beads 28ª on the edges of the opening are disposed with relation to the indicator so that when this comes opposite the beads it will show that the instrument is level. If the body 10 is placed in a vertical position against the wall, the device acts as a plumb, and the pendulum swings the indicator around so as to indicate on the grade table whether or not the level and abutting wall are plumb.

From the foregoing description it will be seen that I have devised a very simple, cheap structure which works accurately, quickly, and positively, which is not likely to get out of repair, and in which the parts which may be broken can be easily replaced.

Attention is called to the fact that the plates 17 are preferably cut away in the center as shown in the drawings so that the indicator can be plainly seen.

I claim:—

1. A level and plumb comprising a body portion having a recess therein, parallel grooved members fixed to opposite sides of the recess, a pendulum supporting member fitting in the grooves of said member and having a part forming a dial and another part formed into a supporting bracket, and a pendulum indicator pivoted on the said supporting bracket and movable opposite the aforesaid dial.

2. A level and plumb comprising a body portion having a recess therein, parallel grooved members fixed to opposite sides of the recess, plates in parallel relation having their edges shaped to slide into the grooves of said member, said plates having a part forming a dial, a part of their middle portion removed, the remainder being formed into a pendulum supporting bracket, and a pendulum indicator pivoted on said bracket and moving opposite said dial.

3. A level and plumb comprising a body portion having a recess therein, opposed grooved members secured to opposite sides of the recess, opposed plates having their edges formed into flanges which slide in the grooves of said member, the said plates having a part forming a dial, a part of their middle portions removed, and a part formed into a pendulum supporting bracket, a pendulum indicator pivoted on said bracket and movable opposite said dial, and transparent covering panes for the recess, said panes fitting against the flanged edges of the aforesaid plates.

4. A level and plumb comprising a body having a recess therein, a graduated table supported in the recess and having holes therethrough at certain marks on the table, and a pendulum indicator swinging opposite the table and having a hole therethrough to register with the holes in the table.

ANDREW ARTHUR.

Witnesses:
 WARREN B. HUTCHINSON,
 M. G. O'DONNELL.